UNITED STATES PATENT OFFICE.

BENJAMIN F. SHAW, OF CAMBRIDGE, MASSACHUSETTS.

IMPROVEMENT IN PURIFYING AND DEODORIZING TALLOW OBTAINED IN RENDERING OFFAL.

Specification forming part of Letters Patent No. 135,373, dated January 28, 1873.

*To all whom it may concern:*

Be it known that I, BENJAMIN F. SHAW, of Cambridge, in the county of Middlesex and State of Massachusetts, have invented an Improvement in Isolating, Purifying, and Deodorizing Tallow, &c., obtained in Rendering Processes; and I do hereby declare that the following is a description of my invention sufficient to enable those skilled in the art to practice it.

It has long been known that the ordinary methods of rendering tallow create a nuisance, and various methods have been proposed and attempted for abating this nuisance. Prominent among these methods is one known as Lockwood and Everett's, in which the crude tallow, suet, bones, offal, or other matter is heated in a digester, under pressure, and the resulting gases are burned. This process is completely successful so far as it goes; but only as the first part of the rendering process, the tallow, oil, or grease obtained—especially that from bone or offal stock—being impure, and requiring further preparation to prevent putrefaction and consequent offensive smell. If this further preparation is attempted by the ordinary method of boiling and skimming, or by treatment with water and sulphuric acid, disagreeable, offensive, and deleterious gases and odors are produced, rendering such process objectionable. Various attempts have been made to absorb these offensive and deleterious gases, one of which methods is to absorb them by a mixture of slaked lime and charcoal spread on a coarse cloth and suspended over the pan. This method is, however, cumbrous and troublesome.

My invention consists in a method by which all offensive odor during the refining or clarifying operation is prevented, and the membraneous and other nitrogenous impurities are dissolved and removed; and I accomplish this in the following manner: In the Wilson process for the utilization of scrap and gelatine from the rendering-tank, (patented by George F. Wilson, of Providence, Rhode Island, May 18, 1869, No. 90,328,) the fat is first allowed to rise to the top of the other contents of the rendering-digester, and is removed by any appropriate means, before the scraps and soup are subjected to his process. In practice I have found that some grease remains in this soup and scrap, and is lost by admixture with the superphosphate in following out said process. The presence of this grease in the superphosphate retards drying and crystallization. Instead of waiting for the fat to thus separate, I at once, as soon as the rendering is finished and the gases blown off, remove the whole of the remaining contents of the tank or digester to a suitable tank, (preferably such as Wilson describes in his patent No. 75,327, March 10, 1868, for the manufacture of superphosphate of lime,) and I then add to the contents of the tank a sufficient quantity of acid phosphate of lime, preferably mixed with carbon and sulphate of lime, adding water if the mixture is too dense to allow of ready separation of the fat. The whole mass is then boiled for some time by the aid of the steam-coils in the bottom of the tank, and is then allowed to stand, but subjected to heat for some hours to maintain the requisite fluidity of the fat, at the end of which time the tallow or grease is removed to another vessel, in which it is boiled to expel any water or other impurity it may contain. When boiled sufficiently it is allowed to settle, and is skimmed, and the clear fat removed to a cooler, when it will be found to have no unpleasant smell, and will keep exceedingly well even during hot weather. The skimmings and settlings are returned to the superphosphate-tank to go through the process again with the succeeding lot of scrap and soup.

The mixture of acid phosphate of lime, sulphate of lime, and carbon is best prepared from refuse sugar-house char, by the aid of sulphuric acid and heat; but I do not limit myself to this method of preparation.

Instead of removing the whole contents of the rendering-tank at once, as above described, the tallow or grease may be removed separately, or with the soup, and then treated as above. The residue, in any case, is useful as a manure, and as such may be utilized in any way that is convenient.

To explain the process more in detail, I take, say, fifteen hundred pounds of acid phosphate of lime, prepared by dissolving bone charcoal with seventy-five per cent. its weight of sulphuric acid marking 65° or 66° Baumé, and sixty per cent. of its weight of water, and add three thousand pounds of scrap in its common state of dryness on removal from digester, and three thousand pounds of soup, or all the soup from the three thousand pounds of scrap, together with the grease or tallow which has been expelled from the same. I adjust the gravity at 5° or less Baumé, stir thoroughly, and cover the tank or keep the room hot—say at 90° to 100° Fahrenheit. The mass is boiled from ten to twenty-four hours, till the tissues are pretty well dissolved, and is allowed to stand ten to twenty-four hours, covered, (or the surface kept warm, as above,) and heated to 140° to 200° Fahrenheit. I then remove the supernatant fat, and if any bones remain undissolved, and it is desired to obtain the grease they may still contain, I add an equivalent of sulphuric acid, or from forty-five pounds to fifty pounds to each one hundred pounds of bones, (estimated as dry,) and stir and treat as before described, giving such time to each part of the process as may be necessary in order to obtain the grease or tallow.

For the refining of tallow, lard, grease, or oil, from which all the scrap has been as carefully removed as is commonly practicable, a hot but not boiling solution of acid phosphate of lime should be kept in a wooden or lead-lined vessel. Two hundred and fifty pounds (250 lbs.) of acid phosphate to five hundred (500) gallons of water make a solution strong enough when but little organic matter is present. The tallow should be poured into this solution and allowed to rise from it and clear itself. The required gravity and temperature should be maintained as previously directed. The organic and other impurities will slowly settle from the fat and be dissolved in the acid solution. The grease carried down by them will then rise and mingle with the clear grease. One solution of acid phosphate may be retained for a longer or shorter period, according to the rapidity with which it becomes saturated. It is only necessary to keep it of the required thinness and temperature, and to preserve its dissolving and deodorizing powers. It is thinned by the addition of water; kept hot by any convenient means; renewed in strength by the addition of acid phosphate made as directed.

I do not claim the use of acid phosphate of lime for the conversion of offal scrap and gelatine into fertilizing compounds.

I claim—

1. The use of acid phosphate of lime, alone or in combination with carbon or sulphuric acid, or their salts, or with any other mixture, in the isolation, purification, and deodorization of tallow, fats, oils, or grease, substantially as described.

2. In combination with the use of acid phosphate of lime, alone or in combination with carbon or sulphuric acid, or their salts, or with any other mixture, in the isolation, purification, and deodorization of tallow, fats, oils, or grease, the use of covers to the tallow-isolating or superphosphate tank, for the purpose specified, the maintaining of the fluidity of the surface fat by means of a high temperature, and the maintaining in the gelatine or watery mass the light gravity or thinness required, all substantially as described.

B. F. SHAW.

Witnesses:
  FRANCIS GOULD,
  M. W. FROTHINGHAM.